United States Patent
Siegel

[11] 3,902,174
[45] Aug. 26, 1975

[54] PULSED DOPPLER RADAR DEVICE HAVING AT LEAST ONE RANGE CHANNEL

[75] Inventor: Harald Siegel, Munich, Germany

[73] Assignee: Siemens Aktiengesellschaft, Berlin & Munich, Germany

[22] Filed: Mar. 14, 1974

[21] Appl. No.: 451,033

[30] Foreign Application Priority Data
Apr. 16, 1973 Germany............................ 2318976

[52] U.S. Cl. ................................................. 343/7.7
[51] Int. Cl. .............................................. G01s 9/42
[58] Field of Search ...................................... 343/7.7

[56] References Cited
UNITED STATES PATENTS
3,742,499  6/1973  Beydler................................ 343/7.7
3,787,850  1/1974  Sletten................................. 343/7.7

Primary Examiner—T. H. Tubbesing
Attorney, Agent, or Firm—Hill, Gross, Simpson, Van Santen, Steadman, Chiara & Simpson

[57] ABSTRACT

A pulsed Doppler radar device with variable repetition frequency, having at least one range channel operatively connectable at the pulse rate of the pulse repetition frequency, a doppler filter which suppresses clutter interference in the low Doppler frequency range, and a device for the variation of the pulse repetition frequency, in which the doppler filter of each range channel comprises at least one sampling-and-holding circuit and a following high pass or band pass filter, the switching pulse rate of the sampling-and-holding circuit being changeable with changes in the pulse repetition frequency, with the same high pass or band filter being utilized for all repetition frequency variations, the cut-off frequency of the following filter, if a high pass filter or, the lower cut-off frequency of such filter, if a band pass filter being approximately equal to the upper frequency of the clutter band width whereby the latter is suppressed, and the upper cut-off frequency, if a band pass filter is employed, being above the maximum pulse repetition frequency.

8 Claims, 9 Drawing Figures

PULSED DOPPLER RADAR DEVICE HAVING AT LEAST ONE RANGE CHANNEL

BACKGROUND OF THE INVENTION

The invention is directed to a pulsed doppler radar device employing at least one range channel, operably connectable at the pulse rate of the repetition frequency, having a doppler filter which suppresses clutter interference occurring in the lower doppler frequency band and further relates to devices in which the pulse repetition frequency is varied.

In the publication "Introduction to Radar Systems" by Skolnik McGraw-Hill Book Company, Inc., 1962, there is disclosed, on page 152, a pulse doppler radar device operating with a plurality of range channels. In such device, each range channel contains, in addition to a so-called box car generator, a band pass filter which functions as a doppler filter to suppress fixed signals. The box-car generator forms from individual narrow sampling pulses long rectangular wave form pulses of uniform amplitude, each of which lasts until the next sampling pulse is formed. The doppler filter has band pass characteristics and is so constructed that multiples of the pulse repetition frequency are suppressed. In addition, one range of low doppler frequencies is also suppressed, frequencies, e.g. such as which may be formed by swaying trees or slow moving vehicles, etc. These signals may generally be designated as "clutter interference."

In many instances it is desirable, from time to time, to change the pulse repetition frequency of a radar device, for example, to gate out interferences or to avoid blind speed ranges. A change in the pulse repetition frequency, however, also necessitated a change in the band pass filters of the known radar devices, as the pass bands of such filters were smaller than the pulse repetition frequency and therefore must also be changed when the pulse repetition frequency is varied. The outlay required for these measures is further increased to a considerable extent, because in radar devices of this type it is generally necessary to provide a relatively large number of range channels, necessitating in such case, a modification or change in the band pass filters for all of the range channels involved. A further deterent to the changing of the pulse repetition frequency is that the necessary high blocking attenuation for fixed target and clutter interference necessitates band pass filters of very complicated construction, as a result of which it is very difficult to effect an alteration in the path band.

BRIEF SUMMARY OF THE INVENTION

The invention is directed to a pulse doppler radar device of the type above described and is directed to the problem of enabling a change in the pulse repetition frequency without the necessity of effecting a change in the filter characteristics of the respective range channel, and at the same time to suppress fixed targets and clutter interference.

These objectives are achieved in accordance with the present invention by the provision of a doppler filter for each range channel which consists of at least one sampling-and-holding circuit, in combination with a following connected high pass or band pass filter. Where a high pass filter is employed, the cut-off frequency thereof is selected approximately equal to the upper limit frequency of the clutter band width which is to be suppressed. In the event band pass filters are employed, the lower cut-off frequency thereof is likewise approximately equal to the upper frequency of the clutter band which is to be suppressed while the upper cut-off frequency is above the maximum pulse repetition frequency employed in the particular radar device. With such construction, the sampling-and-holding circuit is suitably altered in its switching pulse rate with the pulse repetition frequency, with no changes being effected in the associated high pass or band pass filter.

It is thereby possible with the present invention to change the pulse repetition frequency of the radar device at arbitrary times and in arbitrary manner within a very large range, for example, even from 5 to 20 kHz, without requiring change in the filter with change in the pulse repetition frequency. The pulsed Doppler radar devices constructed in accordance with the invention thus are very resistant to interference and require very little additional outlay than pulsed Doppler radar devices with at least one range channel, of conventional construction.

It will be particularly noted that where band pass filters are employed in accordance with sampling-and-holding circuits in accordance with the present invention, the upper cut-off frequency of filters in accordance with the present invention is so selected that it lies above the maximum pulse repetition frequency to be employed, whereas band pass filters in the known circuits always have a pass range which is smaller than the pulse repetition frequency. Consequently, the band width of band pass filters employed with the invention is always greater than that employed in connection with the known arrangements.

BRIEF DESCRIPTION OF THE DRAWINGS

In the drawings wherein like reference characters indicate like or corresponding parts.

DETAILED DESCRIPTION OF THE INVENTION

Figure 1:
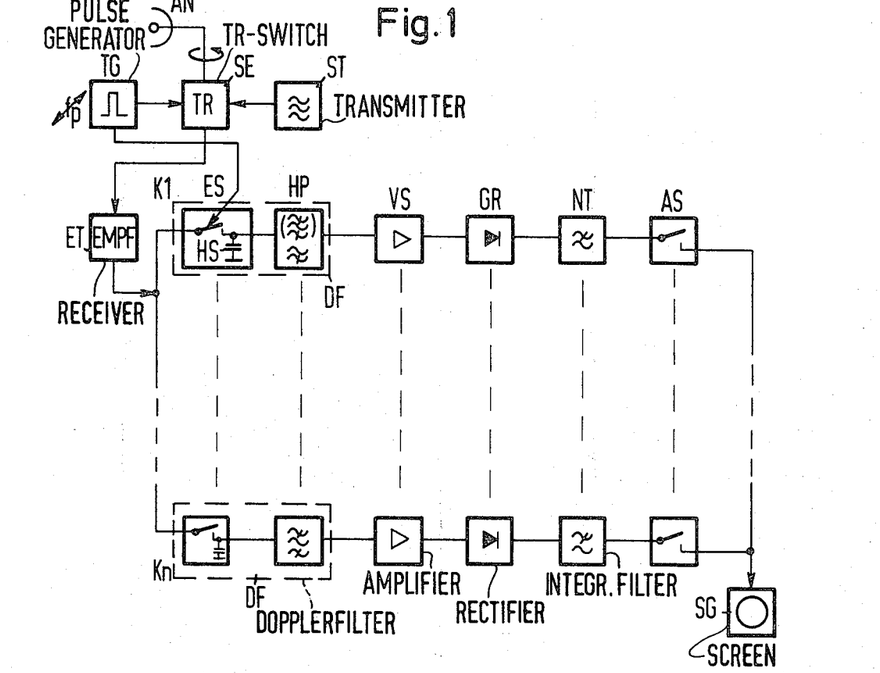
FIG. 1 is a circuit diagram, in block form, of a radar device in accordance with the present invention.

Referring to FIG. 1, there is illustrated a radar device which includes an antenna AN which may be rotated or pivoted over a limited sector, a transmitting-receiving switch SE, a transmitting section ST, a pulse generator TG which determines the pulse repetition frequency, and a (first) receiving section ET which contains, in particular, mixer stages and intermediate frequency amplifiers. The demodulated received signals are conducted, as characteristic video signals, to a second receiving section having a range gate bank composed of $n$ number of identical range gates K1 to Kn, hereinafter referred to as range channels, which are successively connected for a predetermined, preferably constant duration of time $\tau < T/n$ where $T =$ the period duration of the radar device. The duration of the connection is always in the same period of time after the relevant transmitted pulse, with the interval involved determining the range. The pulse repetition frequency (PRF) of $fp = 1/T$ is to be varied within relatively wide limits and thus may be capable of assuming values, for example, of between 5 and 20 kHz. In accordance with this operation, the pulse generator TG contains suitable corresponding switch-over devices, not illustrated. The pulse generator TG thus controls the input switches ES with a switching pulse train which is equal to the pulse repetition frequency $f_p$.

If an echo signal (FIG. 2) appears on the common line preceding the input switches ES of the range channels, it is conducted to that channel whose switch is closed at the time of arrival of the signal pulses. This determines the target range and the individual moving targets can thereafter be separately processed. Connected to the input switch ES is a storage circuit HS which stores the input signal specimen or sample which was gated by the input switch ES, for such time until a new sampling specimen is obtained by a new closure of the switch ES. The switch ES and the storage circuit HS thus form a sampling-and-holding circuit.

Following such sampling-and-holding circuit is a filter HP which may be either a high pass filter or a band pass filter. Assuming it is a high pass filter, the cut-off frequency $f_c$ is so selected that undesired signals having low Doppler frequency values, for example, as a result of surface waves on water, trees moving in the wind or slow moving vehicles, selectively termed clutter interference, are suppressed.

The input switch ES and the filter HP together form, in a manner as hereinafter explained, a Doppler filter DF which suppress fixed target echo signals and passes moving target echo signals above a certain target speed.

It is also possible in lieu of a high pass filter to employ a band pass filter whose lower cut-off frequency likewise is approximately equal to the upper frequency of the clutter interference band, similar to the high pass filter, but in this case the upper cut-off frequency of the band pass filter, in contrast to known Doppler comb filters, lies above the maximum pulse frequency which is employed.

The moving target echo is amplified in the following amplifier VS, rectified in the rectifier GR and rendered unipolar by squaring. The signal to noise ratio is improved, in known manner, in the post integration filter NT, which therefore is of a suitable design to represent an optimum filter for the antenna function with which the echo signal is modulated, i.e., the target sweep. The signal is subsequently conducted on over output switch AS which is closed with the same pulse frequency as the input switch ES, and ultimately suitably analyzed or passed to a display device, for example, a viewing device SG.

Figure 2:
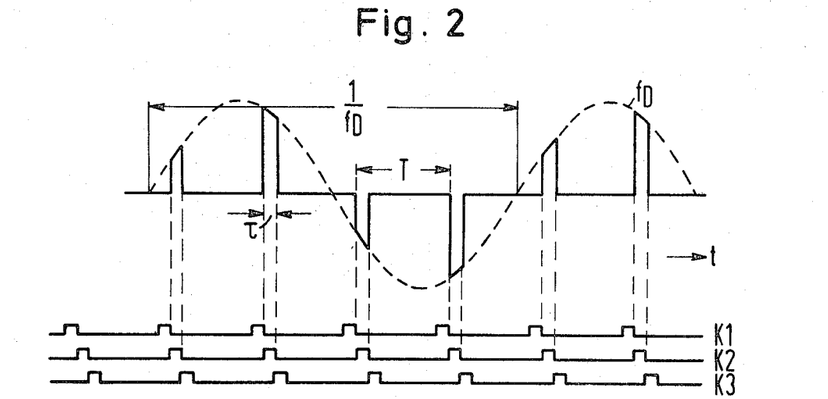
FIG. 2 is a chart illustrating the course of a Doppler oscillation with respect to respective specimen samplings.

The lower portion of FIG. 2 illustrates the drive pulses for the input switches ES of three range channels K1, K2, K3. The echo pulses modulated with the Doppler oscillation $f_D$ possess a time length $\tau$ which equals the closure time of the switches AS. Generally the transmitted pulses also have a length of approximately $\tau$, as a result of which a maximum of echo energy passes to the pertinent range channel. The interval between the beginning of consecutive drive pulses for a specific range channel, i.e., K1, amounts to T (which equals the period duration of the radar device). Thus, each range channel has the same pulse train repetition as the transmitter of the radar device.

Since, as will be clearly apparent from FIG. 2, it is immaterial to the Doppler filter DF whether an echo pulse train is fed to the input switch ES, or whether such switch produces a pulse train by the sampling specimens from the sine wave envelope of the Doppler frequency, the following considerations will always assume that the input signal is a sine wave.

Assuming a radar device pulse repetition frequency of $f_p$, the associated Doppler lines are at $f_d = k \cdot f_p \pm f_D$, where $f_D$ is the actual Doppler frequency and $k = 0, 1, 2, 3 \ldots n$. At a pulse repetition frequency of $f_p = 8$ kHz and a Doppler frequency of $f_D = 2$ kHz, the first three Doppler lines are at 2 kHz, 6 kHz and 10 kHz.

Figure 3:
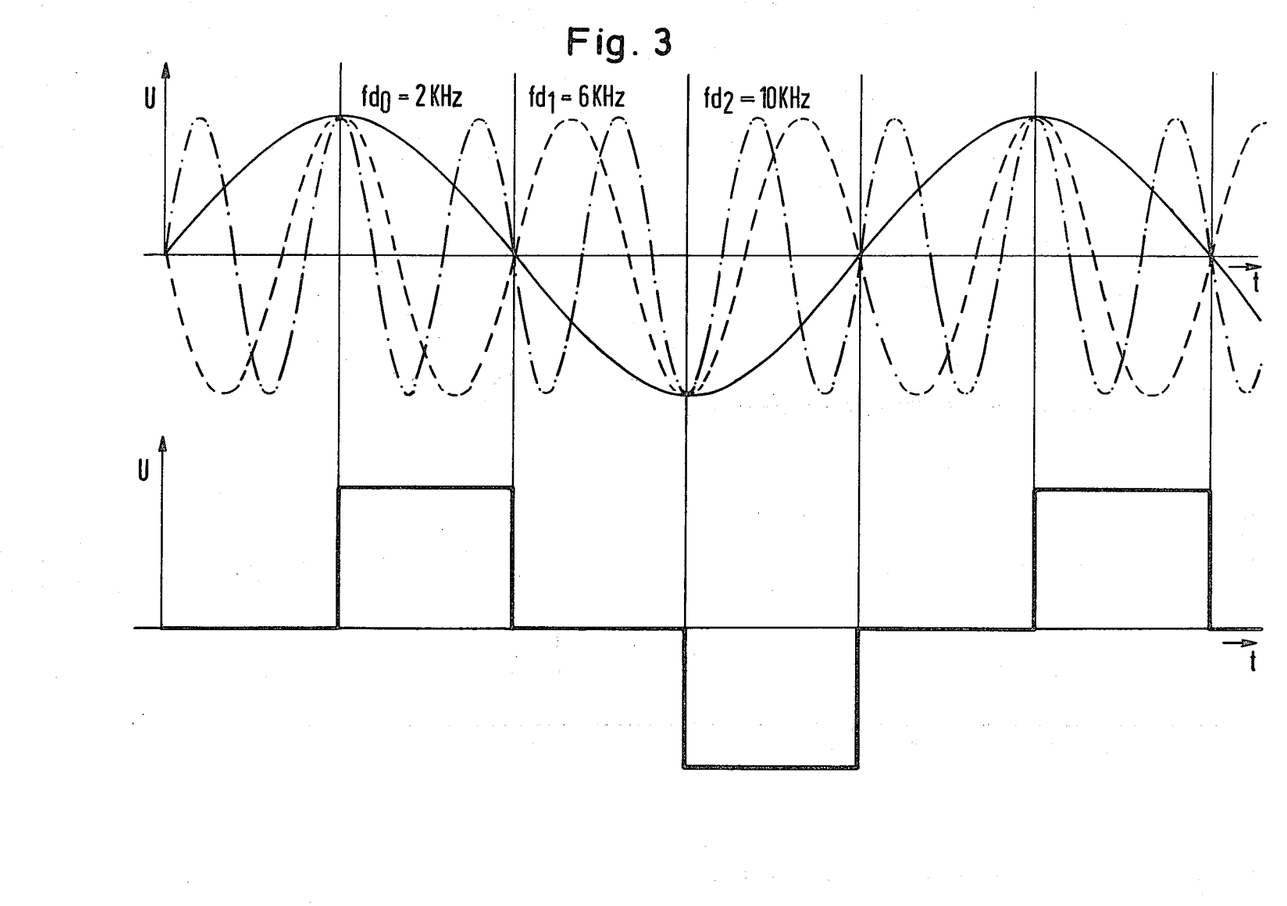
FIG. 3 illustrates various sampling specimens of oscillations relating to the same Doppler frequency.

FIG. 3 illustrates the sampling of three sine signals $f_{d_0} = 2$ kHz, $f_{d_1} = 6$ kHz, $f_{d_2} = 10$ kHz, relating to the Doppler frequency $f_D$, with a sampling frequency of 8 kHz (equal the pulse repetition frequency $f_p$). Illustrated therebelow is the associated output signal of a sampling-and-holding circuit which stores the particular sampling amplitude until the next sampling. The advantages of such a circuit are the amplification by the keying ratio and the spectrum of the staircase curve. It will be noted that the same output functions are formed for all three Doppler frequencies $f_{d_0}, f_{d_1}, f_{d_2}$, with such rule being applicable to all values of $f_D$.

Figure 4:
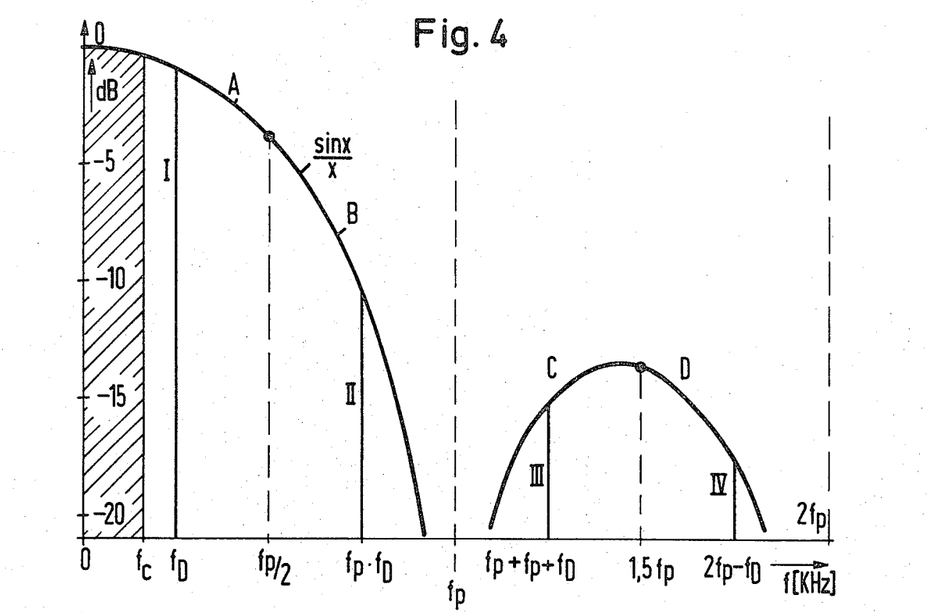
FIG. 4 depicts a line spectrum of a Doppler oscillation.

FIG. 4 illustrates the spectrum pertaining to the staircase curve illustrated in the lower half of FIG. 3, in which the amplitudes of the individual spectral lines I to IV are subject to the rule $\sin x/x$. The input signal with the frequency $f_D$ has spectral lines $f_d = k \cdot f_p \pm f_D$ ($k = 0, 1, 2, 3 \ldots$) as a stepped curve. On the other hand, all the input signals of the frequencies $k \cdot f_p \pm f_D$ have the same spectrum as $f_D$. The value $x$ is governed by the equation $x = (2 \pi \cdot f_D) 1/f_p$. Thus, it is only in the case of input signals from 0 to $f_p/2$ that the actual frequency of the input signal can be clearly concluded from the spectrum. This, however, is of no importance in the case of range gates as it is ncessary here only to differentiate between moving targets, and fixed targets and clutter interference, so that it is not necessary to establish the exact Doppler frequency. If it is assumed that the low frequency clutter interference extends to $f_c$ it is sufficient to block all the input signals between $k \cdot f_p - f_c$ and $k \cdot f_p + f_c$.

While it is of course true that only an ideal sampling-and-holding circuit with an infinitely short sampling time will transmit all the frequencies from 0 to infinity in the spectrum illustrated in FIG. 4, in actual practice, however, useful results can be obtained even with nonideal sampling-and-holding circuits.

Figure 5:
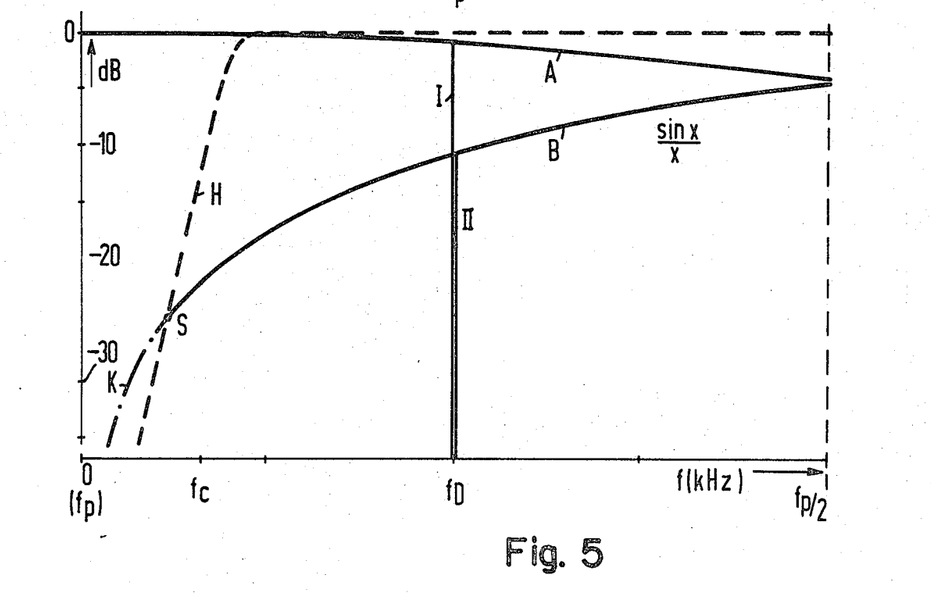
FIG. 5 represents a portion of a line spectrum such as illustrated in FIG. 4.

The following observations are limited to input signals in the frequency range between 0 and $f_p/2$ since thereby the remainder of the frequency course is also determined. In FIG. 5, the spectrum of the sampling-and-holding circuit up to $f_p$ is illustrated and overlapped by $f_p/2$. If the spectral lines above $f_p$ are considered to be negligibly small, the sum of the powers of the two lines I (equals $f_D$) and II (equals $f_p - f_D$) must result in the input power. The part of the curve sin $x/x$ between 0 and $f_p/2$ is, in accordance with FIG. 4, designated A, the part between $f_p/2$ and $f_p$ is designated B, the part between $f_p$ and 1.5 $f_p$ is designated C and the part between 1.5 $f_p$ and 2 $f_p$ is designated D.

Assuming that the filter HP following the sampling-and-holding circuit ES, HS in FIG. 1 is a high pass filter, it is designated by a broken line pass curve H in FIG. 5. This high pass filter controls only the line I ($f_D$) and the latter only when it lies below the clutter cut-off frequency $f_c$. The line II always lies in the pass range of the high pass filter. In the area below the intersection point S of the curves H and B, it is no longer the pass curve H of the high pass filter which determines the attenuation, but the dot dash portion K of the curve sin $x/x$.

Figure 6:
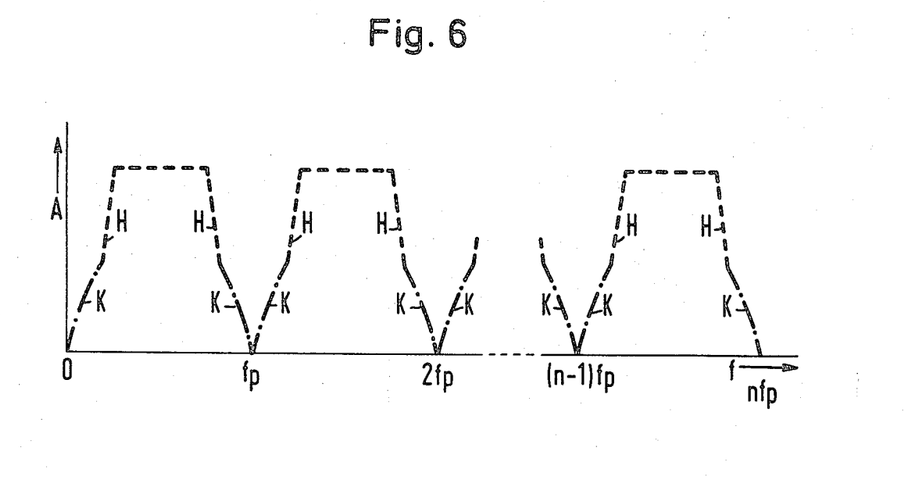
FIG. 6 illustrates the course of the pass curve in the use of a Doppler filter in accordance with the invention.

There thus results a transmission function as illustrated in FIG. 6 composed of portions of the curves K (dot dash) and H (broken line). The same blocking range naturally also occurs for all of the input signals below and above each whole numbered multiple of the repetition frequency $f_p$. The broken-line portion H of the filter flank which is formed by the high pass filter, thus is identical for all multiples of the frequency $f_p$.

The portion formed by the sin $x/x$ function is approximately dependent upon the frequency $f_p$. In the event that $f_p$ is doubled, in the blocking range, i.e., at K, the attenuation increases by $\approx$ 6 dB. In relation to the attenuation values which are in this case are already very high, such changes are of little effect or importance.

The requirement of a considerable degree of independence of the blocking ranges of the range channel in relation to the pulse repetition frequency $f_p$ of the radar device thus may be achieved by the use of a high pass filter in combination with a sampling-and-holding circuit, thus deriving the advantage that it is possible to alter such pulse repetition frequency within wide limits without simultaneously making it necessary to effect a switch over in the Doppler filters of the range channels.

The flank gradient of the filter HP, whether a high pass filter or a corresponding band pass filter, can always be made sufficiently steep. If the flank gradient of the sin $x/x$ function should be insufficient, this difficulty can be overcome by employing two sampling-and-holding circuits in order to increase the attenuation in the vicinity of the pulse repetition frequency $f_p$ (i.e., in the curve section K).

Figure 7:
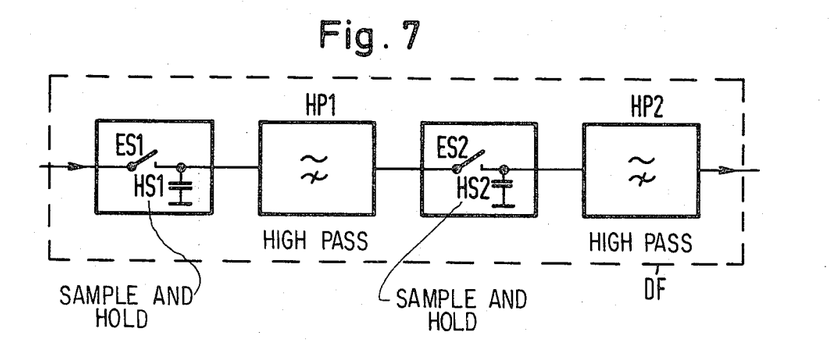
FIG. 7 illustrates, in block form, a further development of a Doppler filter in accordance with the invention.

FIG. 7 illustrates, in block form, a circuit diagram of a Doppler filter employing two sampling-and-holding circuits. The two switches ES1 and ES2 are in this case closed with the same pulse repetition frequency and are provided with corresponding storage devices or pulse lengthening circuits HS1 and HS2. The first sampling-and-holding circuit is followed by a first high pass filter HP1, and the second circuit by another high pass filter HP2. While the switch ES1 is to be closed with a time duration $\tau$ as determined as a result of the system characteristics, the closure time $\tau 2$ of the switch ES2 can be freely selected. It is advisable, however, to select the closure time $\tau 2$ of this switch to be greater which has the advantage that the capacitive storage device HS2 can be so selected that it has a greater capacitance value. Consequently, the input resistance of the following circuit is effective to a lesser extent.

In many cases it may also be expedient to close the switches ES1 and ES2 at different points of time so that it will thus be ensured that the "build up process" of the first stage will always be completed or terminated prior to connection of the second stage.

The frequency characteristics of each range channel are derived from the characteristics of the two high pass filters or band pass filters and the two sampling-and-holding circuits. Details in this connection will be apparent from FIGS. 8a, 8b. The curve components A and B correspond to the corresponding components of FIGS. 4 and 5, while curve components C and D are taken from the right hand portion of FIG. 4 with D being flipped over, i.e., reversed, from 1.5 $f_p$ and with both C and D moved towards the left by $f_p$. The spectral lines above 2 $f_p$ are thus ignored. The sin $x/x$ function 0 to 2 $f_p$ is thus moved into the range from 0 to $f_p/2$.

As an example of an input signal, i.e., clutter, with a frequency $f_{cl} = 0.03 f_p$, the determination of the overall attenuation will be explained. After the first sampling-and-holding circuit (ES1, in FIG. 7) the spectral lines I to IV (FIG. 4) will exist. The relative power of the individual lines at $f_{cl}$ can be determined with the aid of the curves A to D i.e., the curve sin $x/x$. Only the spectral line I is attenuated by the first high pass filter HP1 whose attenuation curve appears in broken lines and is designated H1. The other spectral lines II to IV, curves B, C and D are governed by the level values and not the high pass filter HP1.

Relative power of the lines at the output of the first high pass filter HP1 are:

| Line I   | = | −33.5 | dB |
| Line II  | = | −30.5 | dB |
| Line III | = | −31   | dB |
| Line IV  | = | −37   | dB |

The sum of the powers is −26 dB. 26dB thus is the simultaneous attenuation $f_{cl}$ or $k \cdot f_p \pm f_{cl}$ after the first high pass filter HP1 illustrated in FIG. 7.

Figure 8A:
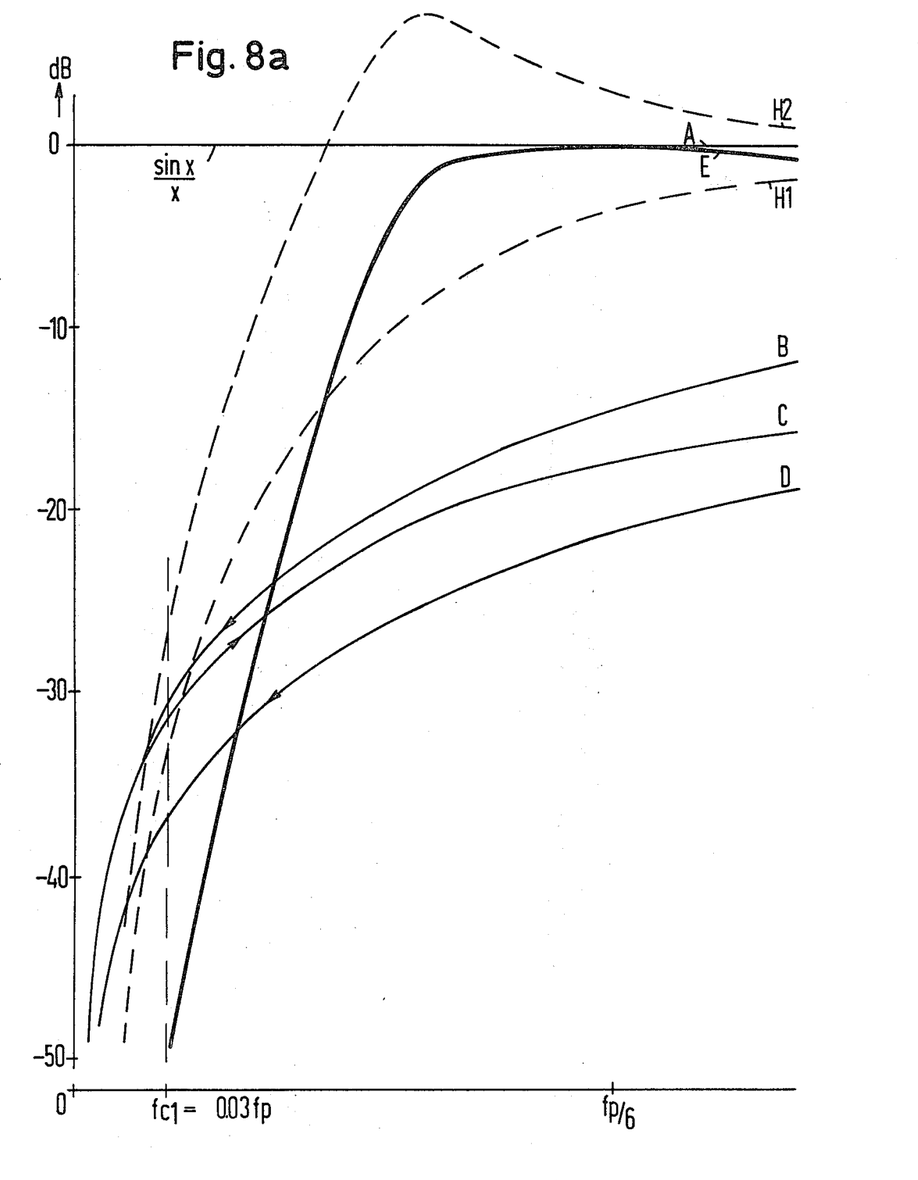
FIGS. 8a and 8b illustrate, when taken together, the composition of the transmission function of a range gate employing a Doppler filter such as illustrated in FIG. 7.
Figure 8B:
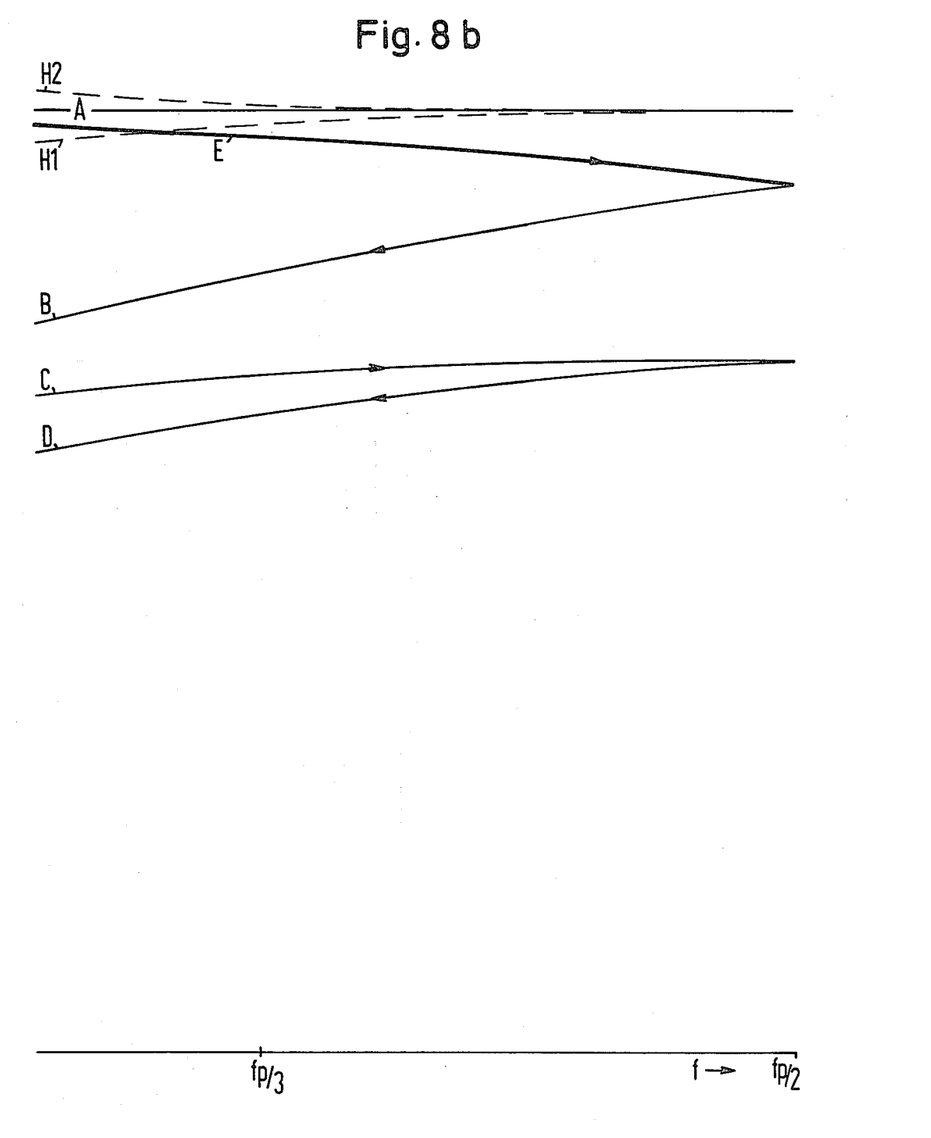

The same spectrum is produced following the second sampling-and-holding circuit (ES2, HS2 illustrated in FIG. 7) as existed following the first circuit, but now attenuated by 26 dB. Again, only the line I which is influenced by the second high pass filter HP2, whose attenuation curve is designated H2 in FIG. 8. The curve H2 is selected to have a steeper gradient than H1. Consequently, at the output of the high pass filter HP2 there will exist:

| Line I   | = | −26 | dB | −26.5 | dB | = | −52.5 | dB |
| Line II  | = | −26 | dB | −30.5 | dB | = | −56.5 | dB |
| Line III | = | −26 | dB | −31   | dB | = | −57   | dB |
| Line IV  | = | −26 | dB | −37   | dB | = | −63   | dB |

The sum of the line powers is −50 dB.

The attenuation of the range channel thus amounts to approximately 50 dB for a clutter signal having a frequency $f_{cl} = 0.03 f_p$. The entire attenuation curve of the range channel may be calculated from the individual curves A, B, C, D and H1, H2. Such curve representing the overall attenuation is designated E in FIG. 8. The blocking range naturally also applies to the frequencies around all of the whole numbered multiples of $f_p$.

In the specific case of an ideal sampling operation (infinitely short sampling time) the frequency response of the range channel between the multiples of $f_p$ is not influenced by the scanning time.

If, however, integration (finite scanning time) is effected during the sampling time (the opening of the range channel), the previously discussed frequency response is superimposed with a second frequency response, which likewise follows a sin $x/x$ function. The zero points are at the whole numbered multiples of $1/\tau$, $\tau$ being the sampling time.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In a pulsed Doppler radar device with variable repetition frequency, having at least one range channel operatively connectable at the pulse rate of the pulse repetition frequency, a doppler filter which suppresses clutter interference in the low Doppler frequency range, and a device for the variation of the pulse repetition frequency, the combination of the doppler filter of each range channel comprising at least one sampling-and-holding circuit and a following high pass filter, the cut-off frequency of which is approximately equal to the upper frequency of the clutter band width whereby the latter is suppressed, the switching pulse rate of the sampling-and-holding circuit being changeable with changes in the pulse repetition frequency, with the same high pass filter being utilized for all repetition frequency variations.

2. A pulsed Doppler radar device according to claim 1, wherein two sampling-and-holding circuits are employed, each with a cooperable filter, which circuits are connected in series.

3. A pulsed Doppler radar device according to claim 2, wherein the attenuation curve of the second filter has a steeper gradient in the area of the cut-off frequency than that of the first filter.

4. A pulsed Doppler radar device according to claim 1, wherein each range channel is provided with an input switch which is connected to the storage circuit and thus forms switching means for the associated sampling-and-holding circuit.

5. In a pulsed Doppler radar device with variable repetition frequency, having at least one range channel operatively connectable at the pulse rate of the pulse repetition frequency, a doppler filter which suppresses clutter interference in the low Doppler frequency range, and a device for the variation of the pulse repetition frequency, the combination of the doppler filter of each range channel comprising at least one sampling-and holding circuit and a following band pass filter, the lower cut-off frequency of which is approximately equal to the upper frequency of the clutter band width whereby the latter is suppressed, and the upper cut-off frequency is above the maximum pulse repetition frequency, the switching pulse rate of the sampling-and-holding circuit being changeable with changes in the pulse repetition frequency, with the same band pass filter being utilized for all repetition frequency variations.

6. A pulsed Doppler radar device according to claim 2, wherein two sampling-and-holding circuits are employed, each with a cooperable filter, which circuits are connected in series.

7. A pulsed Doppler radar device according to claim 6, wherein the attenuation curve of the second filter has a steeper gradient in the area of the lower cut-off frequency than that of the first filter.

8. A pulsed Doppler radar device according to claim 5, wherein each range channel is provided with an input switch which is connected to the storage circuit and thus forms switching means for the associated sampling-and-holding circuit.

* * * * *